United States Patent
Duval

(10) Patent No.: US 11,334,655 B2
(45) Date of Patent: May 17, 2022

(54) AUTHENTICATING A DEVICE USING A REMOTE HOST

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 204 days.

(21) Appl. No.: 16/688,848

(22) Filed: Nov. 19, 2019

(65) Prior Publication Data

US 2021/0150013 A1 May 20, 2021

(51) Int. Cl.
| | |
|---|---|
| *G06F 21/44* | (2013.01) |
| *G06F 21/33* | (2013.01) |
| *G06F 21/12* | (2013.01) |
| *G06F 9/54* | (2006.01) |
| *H04L 9/32* | (2006.01) |
| *G06F 8/65* | (2018.01) |

(52) U.S. Cl.
CPC ............. *G06F 21/33* (2013.01); *G06F 8/65* (2013.01); *G06F 9/542* (2013.01); *G06F 21/12* (2013.01); *G06F 21/44* (2013.01); *H04L 9/3242* (2013.01); *G06F 2221/0751* (2013.01)

(58) Field of Classification Search
CPC .......... G06F 21/33; G06F 21/12; G06F 21/44; G06F 9/542; G06F 8/65; G06F 2221/0751; H04L 9/3242; H04L 9/3247; H04L 9/0891; H04L 9/0643; H04L 9/3268
See application file for complete search history.

(56) References Cited

U.S. PATENT DOCUMENTS

| | | | |
|---|---|---|---|
| 2009/0150525 A1 | 6/2009 | Edgett et al. | |
| 2013/0148562 A1* | 6/2013 | Furuta | H04W 12/35 370/312 |
| 2014/0007076 A1* | 1/2014 | Kim | H04W 4/70 717/173 |

(Continued)

FOREIGN PATENT DOCUMENTS

| | | |
|---|---|---|
| TW | 201434341 A | 9/2014 |
| TW | 201612747 A | 4/2016 |

OTHER PUBLICATIONS

ISA/KR, International Search Report and Written Opinion of the International Searching Authority, Int'l Appl. No. PCT/US2020/055347, Jan. 26, 2021, Korean Intellectual property Office, Seo-gu, Daejeon, Republic of Korea, 9 pgs.

(Continued)

*Primary Examiner* — Nelson S. Giddins
(74) *Attorney, Agent, or Firm* — Holland & Hart LLP

(57) ABSTRACT

Methods, systems, and devices for authenticating a device using a remote host are described. In some systems, a management server may identify a software update for a device and transmit a notification that the software update is sent to the device. In some cases, the system may also include a field server. The field server may receive the notification and set a flag, in a memory, that indicates an association between the device and the software update. The field server may receive, from the device, a connection request that includes a certificate associated with a key for authenticating the device and accept the key as valid based on the flag indicating the update to the software.

22 Claims, 6 Drawing Sheets

(56) References Cited

U.S. PATENT DOCUMENTS

2015/0296470 A1    10/2015  Kim et al.
2018/0217832 A1     8/2018  Moore
2019/0196805 A1     6/2019  Lee et al.
2019/0220611 A1*    7/2019  Nix .................... H04W 4/60

OTHER PUBLICATIONS

IPO, "Office Action," issued in connection with ROC (Taiwan) Patent Application No. 109136452, dated Jul. 5, 2021 (4 pages).
Office Action received for Taiwan Patent Application No. 109136452, dated Jan. 26, 2022, 11 pages (4 pages of English Translation and 7 pages of Original Document).

* cited by examiner

AUTHENTICATING A DEVICE USING A REMOTE HOST

BACKGROUND

The following relates generally to a system that includes at least one memory device and more specifically to authenticating a device using a remote host.

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Some memory devices may go through an authentication process before performing communications with a server. Some memory devices may perform a software update periodically.

DETAILED DESCRIPTION

Figure 1:
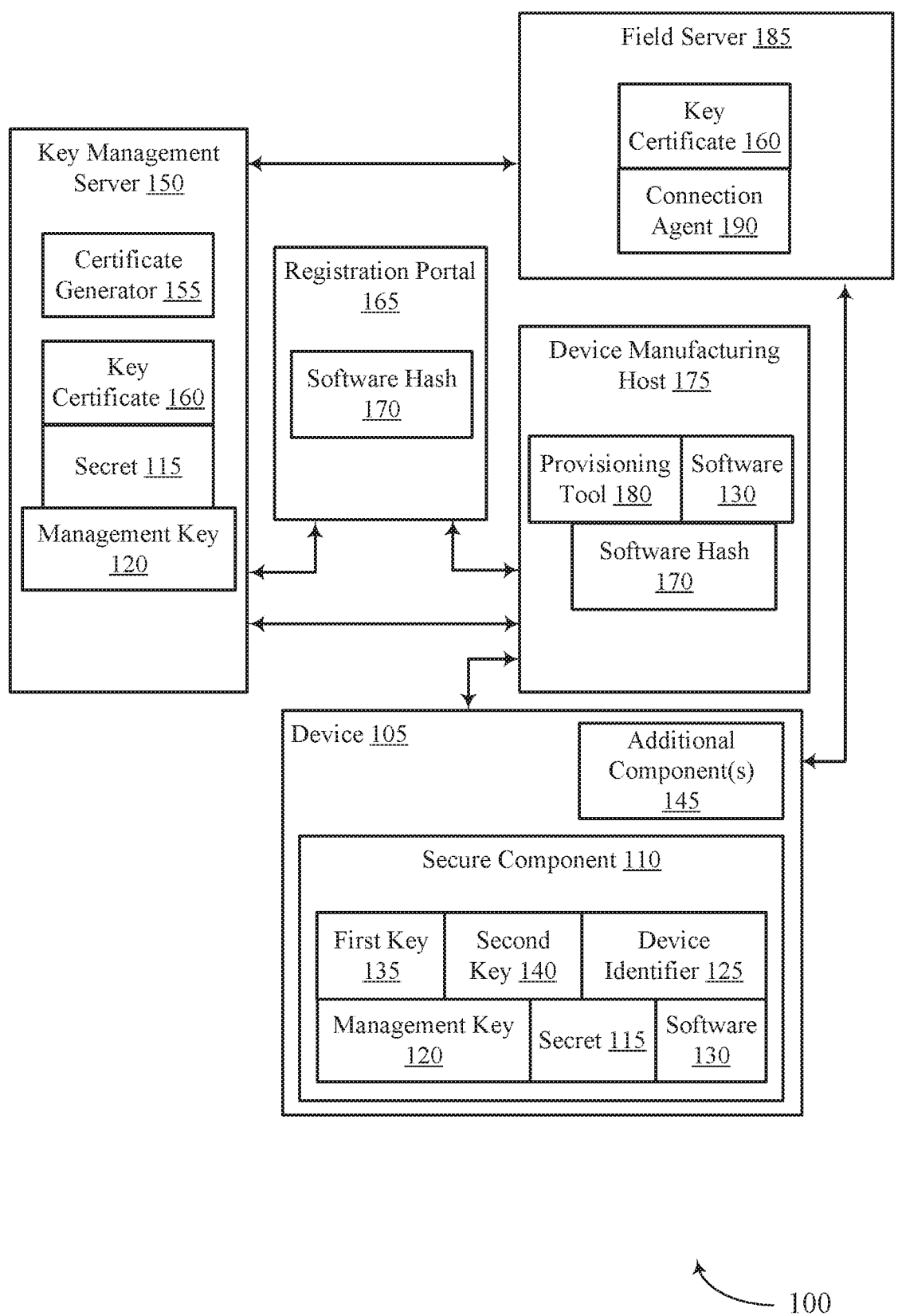
FIG. 1 illustrates an example of a system that supports authenticating a device using a remote host in accordance with examples as disclosed herein.

Some devices may be deployed and operated by a user (e.g., a customer or a client of a manufacturer of the device or components of the device). Once deployed, the devices may be authenticated prior to communicating with a server. Authentication is the process of identifying an individual process or entity that is attempting to log in to a secure domain. Authentication may keep networks secure by permitting only authenticated devices (or processes) to access its protected resources, which may include computer systems, networks, databases, websites and other network-based applications or services. Before accessing data at or providing data to the server, the device may undergo an authentication procedure with the server to ensure that the device requesting access to the server is a specific device or is a non-malicious device (e.g., an untampered device).

The server may authenticate the device based on a key (e.g., a device alias key) associated with the device and a certificate stored at, or otherwise accessible by, the server. For example, a key management server may be utilized for generation of the certificate and the key associated with the device. A device-specific secret and a hash of software of the device may be used to generate the certificates and/or keys. The hash of the software is used when generating certificates and keys as a way to detect if code of the device has been tampered with by an entity. Because a hash of the software is used, when the software of the device is updated it may cause the authentication procedure to fail because of a mismatch between certificates.

According to techniques described herein, the system is operable to update certificates used for an authentication procedure as part of performing a software update on the device. The system may also allow the device to connect to a service based on a valid key recognized by both the device and the server. For example, the server may send a software update to the device. The server may set a flag indicating that the device is experiencing the software update. In such cases, if the device sends a connection request and presents a key or certificate (e.g., an invalid key or invalid certificate that does not match the certificate uploaded into the server because the hash of the software is different), the server may temporarily accept the key as a valid because the flag is set. The server may add the key to a list such that an additional connection request from the device that contains the key may be accepted. In such cases, the system may decrease complexity to the authentication process after a software update occurs, decrease connection delays, decrease cost for a manufacturer of the device or for the user, or a combination thereof.

Features of the disclosure are described in the context of a system and process flow diagram as described with reference to FIGS. 1 and 2. These and other features of the disclosure are further illustrated by and described with reference to apparatus diagrams and flowcharts that relate to authenticating a device using a remote host as described with references to FIGS. 3-6.

FIG. 1 illustrates an example of a system 100 that supports authenticating a device using a remote host in accordance with examples as disclosed herein. The system 100 may include a device 105, a key management server 150, a registration portal 165, a device manufacturing host 175, and a field server 185.

The device 105 may include a secure component 110 that is configured to securely store at least a secret 115. The secret 115 may be an example of a unique device secret (UDS). In some cases, the secure component 110 may store a management key 120. The management key 120 may be an example of a server root key (SRK). The server root key may allow an entity in possession of a copy of the management key 120 to manage the secure component 110 by turning on a security feature of the secure component 110. The device 105 may include one or more components associated with a memory device that are operable to perform one or more authentication procedures for the entire device 220. The device 105 may be an example of an infotainment system of a vehicle, a personal computer, a portable electronic device, a server, or any other type of computing device.

The secure component 110 may include a device identifier 125 generated according to a device identifier composition engine (DICE) standard or a standard associated with/RIoT or a combination thereof. In some cases, the device identifier 125 may be based on the device secret 115 and the software 130. The device identifier 125 may be used to generate asymmetric key pairs, such as a first key pair 135 and a second key pair 140. The first key pair may be an example of an alias key pair, and the second key pair 140 may be an example of a device identification key pair. In some examples, the device 105 may include one or more additional component(s) 145 that are connected to the secure component 110 to provide the functionality of the device 105 in connection with the software 130.

In some examples, a set of commands may be executed in the device 105 to generate the device identifier 125 from the secret 115 and from a cryptographic software hash 170. In such cases, the device 105 may be in communication with the device manufacturing host 175. The device manufacturing host 175 may include a provisioning tool 180, the software 130, and the software hash 170. The execution of the set of commands may further generate the asymmetric key pair, such as the first key pair 135 and the second key pair 140.

The system 100 may include a key management server 150 that is in communication with the device manufacturing host 175. The key management server 150 may include a certificate generator 155. The certificate generator 155 may be configured to emulate a feature of the device 105 in generating the asymmetric key pairs. For example, the certificate generator 155 may be configured to use the same set of commands executed in the device 105 to generate the device identifier 125 from the copy of the secret 115 stored in the key management server 150 and from the software hash 170 received from a registration portal 165. In such cases, the registration portal 165 may be in communication with the device manufacturing host 175 and the key management server 150.

The set of commands executed in the certificate generator 155 may generate the asymmetric key pair (e.g., the first key pair 135 and the second key pair 140). For example, the software hash 170 and the secret 115 may be combined to create a key. In some examples, the certificate generator 155 may generate a certificate (e.g., key certificate 160) based on the key. For example, the certificate generator 155 can digitally sign a certificate (e.g., a key certificate 160) for the public key in the corresponding asymmetric key pair, using a private key of the certificate generator 155 or the key management server 150. The authenticity of the key certificate 160 may be verified via the public key of the certificate generator 155.

In some cases, the key management server 150 may provide the key certificate 160 of the device 105 to the field server 185, thereby enabling the field server 185 to authenticate the device 105 based on the public key certified by the certificate generator 155 and messages (e.g., certificates) signed by the device 105 using its corresponding private key. In such cases, the field server 185 may validate the authenticity of the public key having the certificate signed by the certificate generator 155.

Once a public key of the device 105 is certified, the device 105 may use the corresponding private key to authenticate itself to the field server 185. In such cases, the device 105 may communicate directly with the field server 185. In some examples, the device 105 may digitally sign a message using the private key. If the public key that is associated with a private key of the device 105 is used to verify the digital signature of the certificate, the device 105 may be considered to have possession of the private key. In other examples, the device 105 may be considered to have the identity specified in the certificate signed by the public key. In such cases, the system 100 allows the device 105 to be loaded with software at a time and location different from the implementation of the secrets in the secure component 110 (e.g., management key 120 and secret 115). The system 100 may also allow the device 105 to connect to a service based on a valid public key.

The field server 185 may include multiple, different services for the device 105. In some cases, the different services depend on the device state. For example, when the device 105 is registered through the registration portal 165, one or more software hashes 170 may be uploaded. Each software hash 170 may represent a valid version of the device 105. In some cases, the device 105 may go through a supply chain that may include multiple steps, where each step may represent a different version of software 130. The field server 185 may request what step the device is at in the supply chain in order to be notified of the version of software 130.

The device 105 may be registered by uploading every software hash 170 (e.g., indicating each step in the supply chain) to the registration portal 165. The certificate generator 155 may generate a certificate for each software hash 170. In such cases, the key management server 150 may upload each version of the software hash 170 to the field server 185. When the device 105 presents a key to the field server 185, the field server 185 may connect the device 105 to the service associated with the device state (e.g., software hash 170).

In some examples, the device 105 may modify a list of software hashes 170 uploaded to the registration portal 165. For example, the device 105 may request to add or remove the software hash 170 from the list of software hashes 170. In some examples, the device 105 may communicate the request to add or remove the software hash 170 directly to the key management server 150 rather than communicating with the key management server via the registration portal 165. The certificate generator 155 may regenerate a certificate based on if they software hash is removed or added.

In some examples, the field server 185 may include a connection agent 190 and one or more key certificates 160. When the field server 185 receives a key from the device 105, the field server 185 may compare each of the key certificates 160 in the field server 185 to the received key. In other examples, the field server 185 may identify a key certificate 160 for comparison based on the device state. For example, the device 105 may send a notification to the field server 185 of the device state. Based on the device state, the field server 185 may check the certificate that corresponds to the device state.

In some examples, the device 105 may transmit a connection request to the connection agent 190. The request may include a key and device identifying information (e.g., a device identification (ID)). The connection agent 190 may match the connection request (e.g., the key) to a key certificate 160. If the key presented is not valid (e.g., does not match the key certificate 160), then the connection agent 190 may determine that the device 105 is performing a software update, the device is experiencing an error, or both. In some cases, the error may indicate that identifies that the device 105 includes faulty or malicious software.

The connection agent 190 may add a new key to a local list if the connection agent 190 determines that the device 105 is experiencing a software update. The software update may cause the key certificate 160 to be invalid. For example, the key certificate 160 is generated based on hashing the software hash 170 (e.g., software code). In such cases, the software update may include an update to the software hash 170, thereby indicating a mismatch between the key certificate 160 and the updated software hash 170. For example, any updates to the software 130 of the device may not be reflected in the key certificate 160 stored by the field server 185. In some examples, the key certificate 160 may be regenerated based on the software update (e.g., updated software hash 170). In some cases, the software hash 170 may check if the software code has been modified without permission (e.g., via an unauthorized user).

The field server 185 may set a flag that indicates that the software update is ongoing. In some examples, the field server 185 may temporarily allow the invalid key based on adding the new key to the local list and setting the flag. In other examples, if an invalid key is presented to the connection agent 190, the connection agent 190 may request a key certificate 160 from the device 105. Once the field server 185 receives the requested certificate, the field server 185 may verify (e.g., validate) the invalid key.

The device 105 may access the connection agent 190 based on the device 105 including a subscription to a service associated with the field server 185. In some examples, the device 105 may present a valid key to the field server 185. In such cases, the connection agent 190 may route the device 105 to the service that corresponds to the valid key.

In some examples, each key may include a separate profile. For example, the connection agent 190 may match the device 105 to the profile based on the key presented to the field server 185. In some cases, the profile may match the software image present on the device 105. The profile may be associated the field server 185 in addition to the secret 115 and the software hash 170. In some examples, the profile may be embedded in the software hash 170, the profile may be associated with a service, or both. In some cases, the field server 185 may identify the profile associated with the software image and route the device 105 to the service associated with the profile.

The system 100 may illustrate a process to onboard software 130 on the device 105 with a configuration for secure authentication of the device 105 in accessing the field server 185. For example, the secure component 110 may be configured in a factory without any knowledge or access to software 130 that may be subsequently developed and/or installed in the device 105 that uses the secure component 110. When the secure component 110 is the factory, secrets (e.g., management key 120 and secret 115) of a first root-of-trust may be injected into the secure component 110. A copy of the secrets may be stored into the key management server 150 (e.g., with an identification of the secure component 110) via a secure connection between the factory and the key management server 150.

In some examples, a device manufacturer develops a design of the device 105 that integrates the secure component 110 and additional components 145. The software 130 for operating the device 105 may become available at the facility (e.g., field server 185) of the device manufacturer. In some cases, the provisioning tool 180 may be used to install the software 130 in the secure component 110 and generate information about the software 130. The information about the software 130 may be used in the device 105 to generate the device identifier 125 of the device 105.

The information about the software 130 may be an example of the software hash 170 of the software 130. For example, the software hash 170 may be a cryptographic function of the source code of the software 130. In some cases, the software hash 170 may represent information of a second root-of-trust associated with the device manufacturer. In other examples, the software hash 170 may be digitally signed using a private key of the device manufacturer.

The software hash 170 used for the generation of keys in the device 105 may be communicated to the key management server 150 via a registration portal 165 during the registration of the secure component 110. In some cases, the software hash 170 may be provided to the device 105 as part of an installation process of the software 130 in the device 105. In such examples, the certificate 160 stored on the field server 185 may be based on the software hash 170 of the original software. Any updates to the software 130 of the device may not be reflected in the certificate 160 stored by the field server 185. Techniques for updating the certificate after a software update are described herein. In some examples, the certificate generator 155 may use the software hash 170 to generate a public key of the device 105, independent of the operations of the device 105, and sign the key certificate 160 for the public key of the device 105.

The registration portal 165 may use the management key 120 to manage the secure component 110 and activate the security feature of the secure component 110 after the registration of the secure component 110 and/or after the generation of the key certificate 160. After the security feature of the secure component 110 is activated, the secure component 110 installed in the device 105 may be used in generating the device identifier 125 of the device 105 and cryptographic keys (e.g., the first key pair 135 and the second key pair 140) of the device identifier 125.

Figure 2:
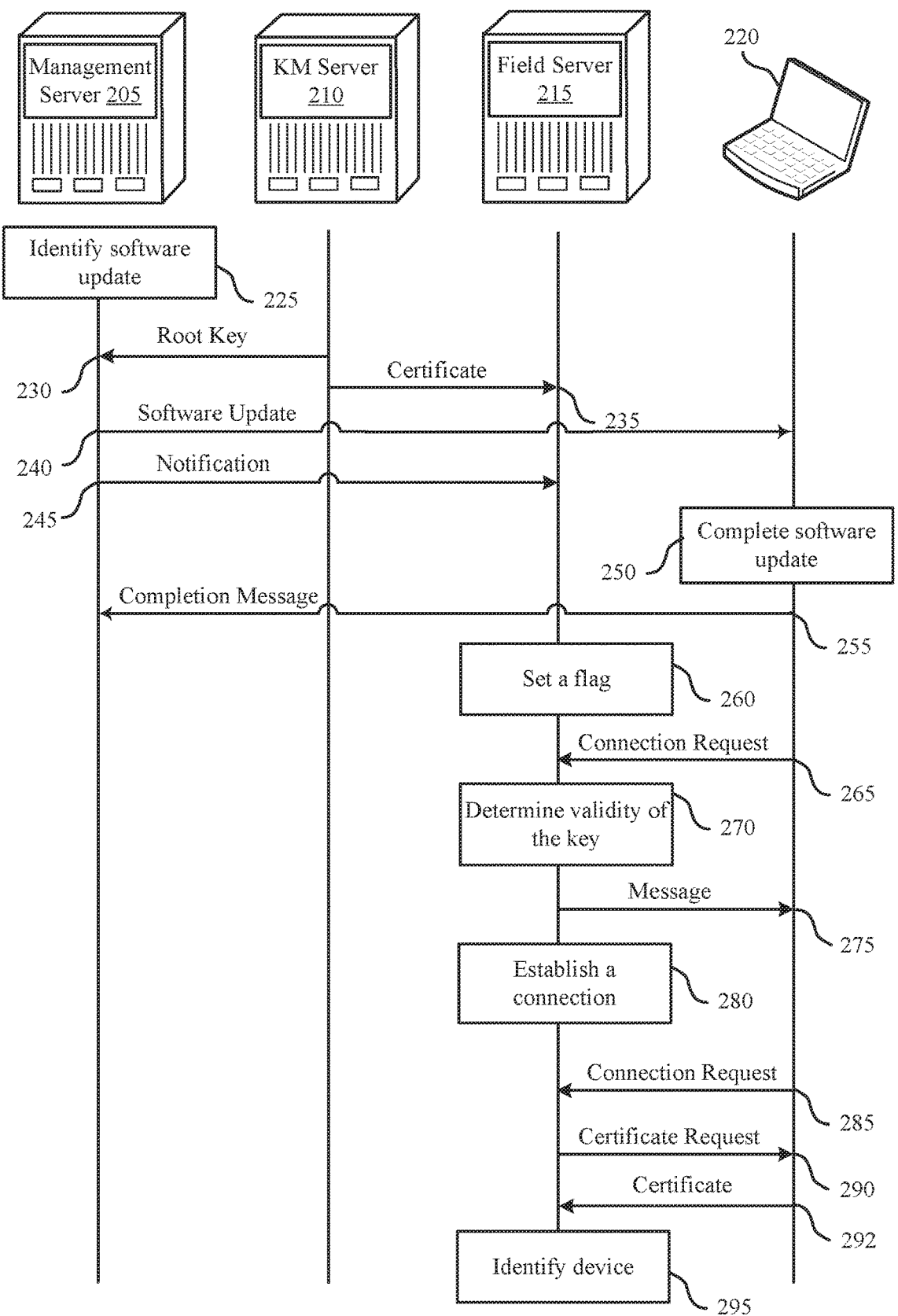
FIG. 2 illustrates an example of a process flow that supports authenticating a device using a remote host in accordance with examples as disclosed herein.

FIG. 2 illustrates an example of a process flow 200 that supports authenticating a device using a remote host in accordance with examples as disclosed herein. The process flow 200 may include a management server 205, a key management (KM) server 210, a field server 215, and a device 220, which may be examples of the corresponding devices described above with reference to FIG. 1. The process flow 200 may illustrate authenticating a device using a remote host. The remote host may refer to the management server 205, the KM server 210, the field server 215, other components, or combinations thereof.

At 225, the management server 205 may identity a software update. As part of the initialization process, at 230, the KM server 210 may transmit a root key to the management server 205. At 235, the KM server 210 may generate a certificate and upload the certificate to the field server 215. In some cases, the KM server 210 may generate a certificate for each software hash uploaded to the KM server 210. The certificate may include an alias key, a public key, and a certificate signed with a device ID private key. In some cases, the field server 215 may receive more than one certificate where each certificate includes an alias key and a public key.

At 240, the management server 205 may initiate a software update. For example, the management server 205 may transmit the software update to the device 220. The device 220 may update its software based on receiving the software update from the management server 205. Such procedures may include the device 220 sending an acknowledgement or negative acknowledgement that the update was successful.

At 245, the management server 205 may notify the field server 215 that a software update is sent to the device 220. In such cases, the field server 215 may receive a notification that a software update is sent to the device 220. The notification may be for identifying that a certificate associated with a key received from the device 220 is altered based on the software update. In some examples, the field server 215 may authenticate the software of the device 220, thereby indicating that the software is secure.

At 250, the device 220 may perform and complete the software update. In some examples, the device 220 may hash the software of the device 220 and generate the key based on the hash of the software and a device-specific secret. The software update may occur at any time of the process flow 200. At 255, the device 220 may transmit a completion message to the management server 205. The completion message may indicate that the device 220 performed the software update.

At 260, the field server 215 may set a flag that indicates an association between the device 220 and the software update in a memory of the field server 215. For example, the field server 215 may note in a database to flag the device 220 as undergoing a software update. In some cases, using the notification and the flag may enable the system to update the certificate stored on the field server 215 without involving the KM server 210 to generate updated certificates. Such procedures may introduce latency into the software update or may introduce other complications related to ensuring that the certificates are correct.

At 265, the field server 215 may receive, from the device 220, a connection request that includes a certificate associated with a key for authenticating the device 220. For example, the device 220 may present an alias key (e.g., first key) to the field server 215 by sending an establishment message (e.g., connection request). In some cases, the connection request may include device ID information. In such cases, the device ID information may instruct the field server 215 to match the key and the certificate uploaded at 235.

At 270, the field server 215 may determine the validity of the key received from the device 220. For example, at 270, the field server 215 may determine that the key received from the device is invalid. In some examples, the field server 215 may determine (e.g., accept) the key as valid based on the flag indicating the association between the device 220 and the software update. For example, the field server 215 may temporarily accept the key as valid based on the flag. At 270, the field server 215 may store the key in a list in the memory based on determining the key as valid.

At 270, the field server 215 may determine whether the certificate associated with the connection is valid. In some examples, the field server 215 may identify a discrepancy between the certificate associated with the key (e.g., included in the connection request) and a certificate associated with the device. For example, the field server 215 may compare the certificate associated with the key to a certificate stored by the field server (e.g., at 235). When a discrepancy is identified, the field server 215 may identify the device that sent the certificate and may identify whether the flag related to software updates has been set. If the flag is set, the field server 215 may authenticate the connection request and save the certificate received form the device 220 as part of the connection request as the new certificate stored by the field server 215. In some instances, the field server 215 may clear the flag based on storing the received certificate with the updated hash values of the software code as the certificate for the device 220. In some examples, the field server 215 may recognize and authenticate the device 220 based on the key matching the certificate. In some cases, the device 220 may transmit a device state to the field server 215, thereby decreasing the time to compare the key and the certificate. In such cases, the field server 215 may identifier the device and whether the flag is set based on the device state. In other examples, the field server 215 checks each certificate uploaded to the field server 215 when the field server 215 receives the key from the device 220.

At 275, the field server 215 may transmit, to the device 220, an acknowledgement (ACK) message or a negative acknowledgement (NACK) message indicating whether the key is valid. For example, the field server 215 may send an ACK message when the key is valid or the field server 215 may send a NACK message when the key is invalid. In some cases, the field server 215 may identify that the alias key does not match the certificate stored by the field server 215. In such cases, the field server 215 may transmit a message requesting the certificate (e.g., alias certificate matching the alias key) from the device 220.

At 280, the field server 215 may establish a connection between the device 220 and a service based on determining the key as valid (e.g., determining that the certificate received from the device 220 includes the key). For example, at 280, the field server 215 may validate the connection request regardless of the discrepancy based on the flag indicating an association between the device 220 and the software update. In such cases, determining that the key is valid is based on validating the connection request. In other examples, the field server 215 may authenticate the device 220 for access to an application platform based on comparing the certificate associated with the key and the certificate. For example, the field server 215 may validate a subscription to the service. Authenticating the device 220 may allow the device 220 to communicate with the application platform and subscribe to the service.

Alternatively or additionally with using the flag, the management server 205 may transmit an updated certificate associated with the device 220 based on receiving the completion message from the device 220 that the software update is complete. In such cases, the field server 215 may receive an updated certificate associated with the device 220 after the software of the device 220 is updated. The field server 215 may update a certificate associated with the device 220 stored by the field server 215. Alternatively or additionally with using the flag, the management server 205 may transmit the software update to the KM server 210. The KM server 210 may receive the software update and generate an updated certificate based on the software update (e.g., the updated hash of the software). In such cases, the KM server 210 may transit the updated certificate to the field server 215. The field server 215 may update a certificate associated with the device 220 stored by the field server 215 based on receiving the updated certificate.

At 285, the device 220 may transmit a connection request. In such cases, the field server 215 may process the connection request from the device 220 based on determining the key as valid. For example, the device 220 may bypass establishing the connection with the field server 215 because the connection has already been established (e.g., the key was previously recognized as valid).

In other examples, the device 220 may experience a connection failure when the device 220 transmits a connection request that includes a certificate associated with an invalid key for authenticating the device 220. At 290, the field server 215 may receive the connection request and transmit a certificate request for a self-signed certificate. In such cases, the field server 215 may request that the device 220 sign the certificate with the private key (e.g., valid key) to verify the authentication based on the certificate in the connection request including the invalid key.

At 292, the device 220 may send the signature (e.g., signed certificate) to the field server 215. In such cases, the field server 215 may determine that the device 220 includes the private key based on the certificate being signed with the private key. At 295, the field server 215 may identity the device due to the signed certificate. For example, the field server 215 may identity which device 220 may be attempting to connect with the field server 215.

At 292, the field server 215 may identify that the device 220 includes an error. In such cases, the device 220 may trigger an alarm that may be cryptographically stronger (e.g., with an increased certainty) than the field server 215 receiving a status update from the device 220 indicating the error. The field server 215 may verify that the device 220 is associated with the alarm, thereby using the verification for forensics analysis to determine the identification of the device 220, the location of the device 220, or both.

Figure 3:
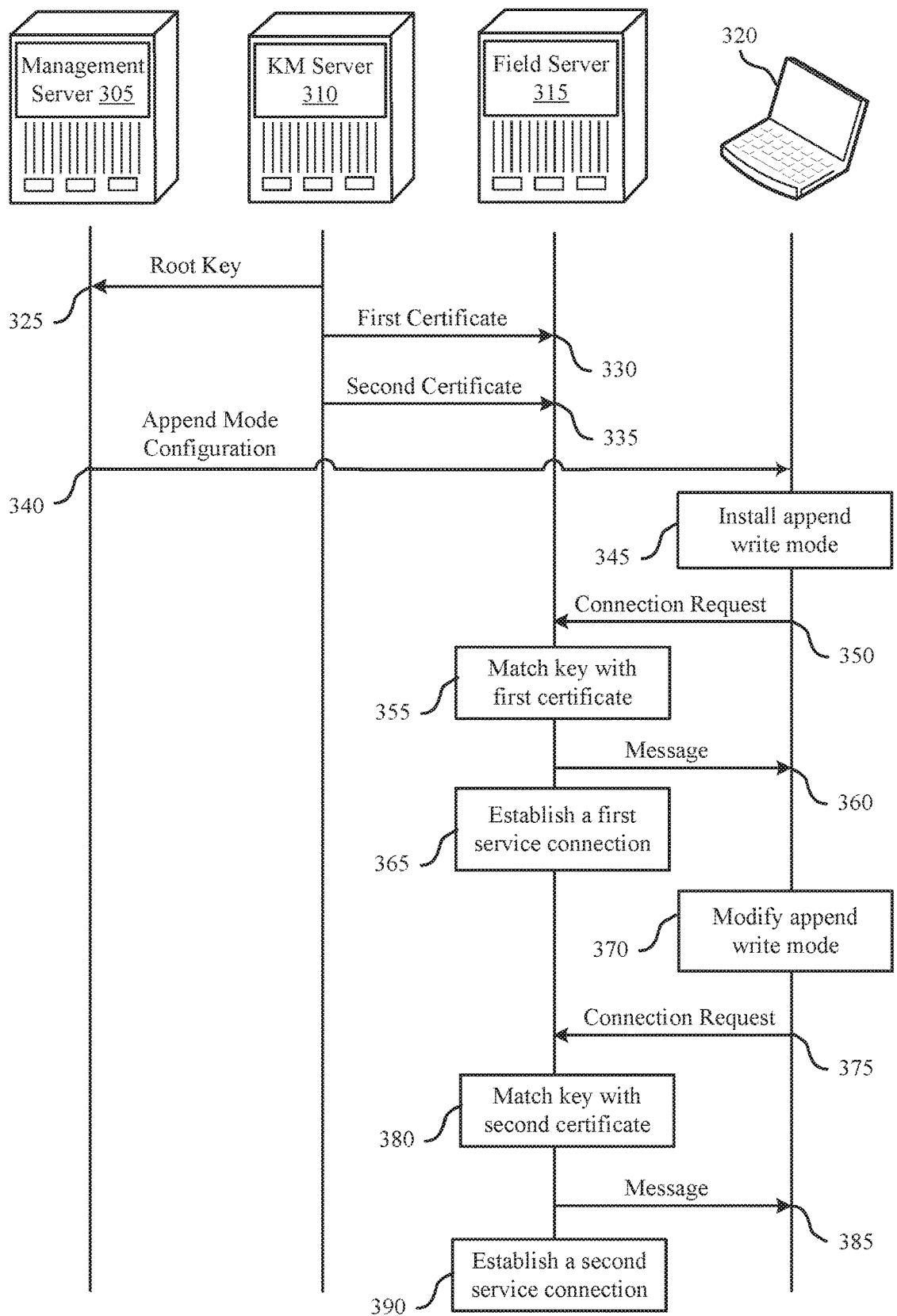
FIG. 3 shows a block diagram of a process flow that supports authenticating a device using a remote host in accordance with examples as disclosed herein.

FIG. 3 illustrates an example of a process flow 300 that supports authenticating a device using a remote host in accordance with examples as disclosed herein. The process flow 300 may include a management server 305, a KM server 310, a field server 315, and a device 320, which may be examples of the corresponding devices described above with reference to FIGS. 1 and 2. The process flow 300 may illustrate operating in an append write mode.

At 325, the KM server 310 may transmit a root key to the management server 305. In some cases, the KM server 310 may generate a certificate for each software hash uploaded to the KM server 310. For example, the registration portal may upload, to the KM server 310, a software hash for a first version of software and a software hash for a second version of software. In such cases, the KM sever 310 may generate a certificate for every software hash and for every device 320. At 330, the KM server 310 may generate a first certificate and upload the first certificate to the field server 315. At 335, the KM server 310 may generate a second certificate and upload the second certificate to the field server 315.

At 340, the management server 305 may configure a portion of the device 320 to operate in an append write mode. The append write mode may be applied to one or more portions of memory cells in the device 320 and may prevent non-privileged users from erasing content within the one or more portions of the device 320.

At 345, the device 320 may install a first version of the software, thereby configuring a portion of the device 320 to operate in append write mode. At 350, the field server 315 may receive, from the device 320, a connection request that includes a certificate associated with a first key for authenticating the device 320. At 355, the field server 315 may match the first key with the first certificate. For example, the field server 315 may determine the validity of the first key received from the device 320 based on the first certificate received from the KM server 310. At 360, the field server 315 may transmit, to the device 320, an ACK message indicating that the first key is valid.

In some cases, the management server 305 may use the append write mode to invalidate a certificate of the device 320. For example, the management server 305 may append additional information to the software. Such actions may cause the certificate generated by the device 320 and communicated as part of a connection request not to match the certificate stored by the field server 315. If the flag is not set in the field server 315, the field server 315 may fail to authenticate the device 320 based on the mismatch between the certificates. In some cases, the management server 305 may update a key received from the device 320 based on appending the additional information. In such cases, access to services on the field server 315 may be removed (e.g., blocked) based on updating the key.

At 365, the field server 315 may establish connections (e.g., at least a first connection) between the device 320 and the field server 315 based on the first key matching the first certificate. For example, a user of the device 320 may subscribe to one or more services (e.g., music listening services, mapping services, travel support services, or others). The field server 315 may establish a connection to the one or more services.

In other examples, the management server 305 may write information in the append write mode portions of the device 320 based on subscription services being expired. For example, some of these services may be provided on a temporary basis based on the user paying a fee. If subscription expires (for any reason, including a non-payment of fees), the software may write to a secure flash within the device 320. In such cases, the image on the device 320 may change thereby altering the underlying code that used to generate the hash for generating the certificate.

Invalidating the subscription to the service in this manner may prevent the device 320 from connecting to the service. In some cases, the software image may be modified on the device 320 by an external computer. For example, a programming tool with direct access to the device 320 may modify the software image, a remote server transmitting the software update may modify the image, or both.

At 370, the device 320 may modify the append write mode. For example, the device 320 may modify (e.g., update) the first version of the software to a second version of the software. At 375, the field server 315 may receive, from the device 320, a connection request that includes a certificate associated with a second key for authenticating the device 320. At 380, the field server 315 may match the second key with the second certificate. For example, the field server 315 may determine the validity of the second key received from the device 320 based on the second certificate received from the KM server 310. At 385, the field server 315 may transmit, to the device 320, an ACK message indicating that the second key is valid.

At 390, the field server 315 may establish connections (e.g., at least a second connection) between the device 320 and the field server 315 based on the second key matching the second certificate. For example, the field server 315 may establish a connection to the one or more services (e.g., music listening services, mapping services, travel support services, or others).

To establish or re-establish a connection between the device 320 and the field server 315, the software hash may be updated, and a new certificate may be requested to access the service. The service may interact with the device 320 during a time period corresponding to a payment plan to access the service. The time period may start at a purchase of the service and extend until an expiration date of the service. After the expiration date, the field server 315 may change the contents (e.g., modify the software image) to prevent access to the service. In such cases, the key corresponds to a profile associated with the service such that changing the contents may invalidate each profile associated with the service.

Figure 4:
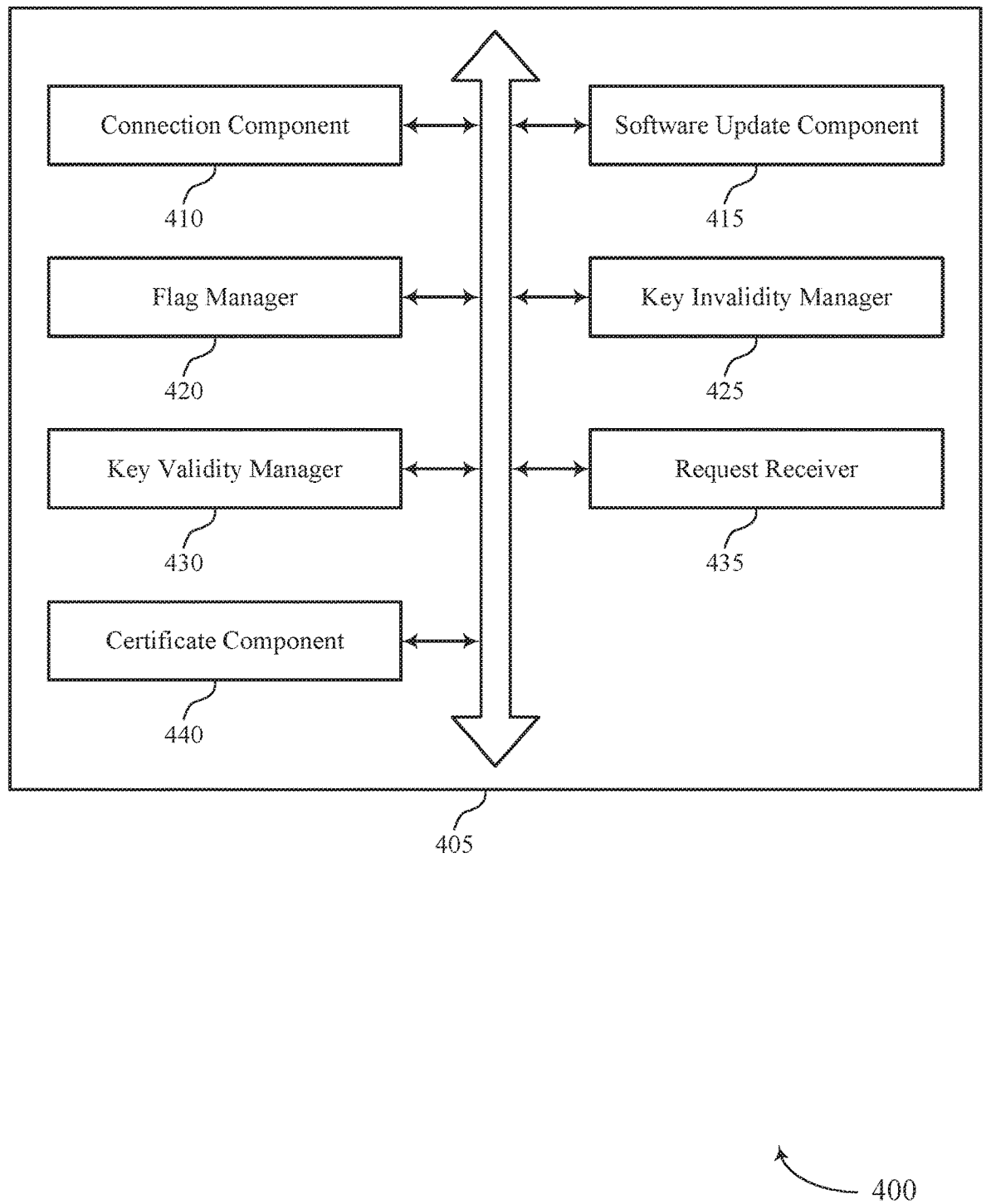
FIG. 4 shows a block diagram of a field server that supports authenticating a device using a remote host in accordance with examples as disclosed herein.

FIG. 4 shows a block diagram 400 of a field server 405 that supports authenticating a device using a remote host in accordance with examples as disclosed herein. The field server 405 may be an example of aspects of a field server as described with reference to FIGS. 1-3. The field server 405 may include a connection component 410, a software update component 415, a flag manager 420, a key invalidity manager 425, a key validity manager 430, a request receiver 435, and a certificate component 440. Each of these modules may communicate, directly or indirectly, with one another (e.g., via one or more buses).

The connection component 410 may establish a connection between the device and a service based on determining the first key as valid. In some examples, the connection component 410 may validate the connection request regardless of the discrepancy based on the flag, where determining the first key is valid is based on validating the connection request. In some examples, the connection component 410 may authenticate the device for access to an application platform based on comparing the certificate associated with the first key and the certificate.

In some examples, the connection component 410 may validate a subscription to the service based on authenticating the device. In some examples, the connection component 410 may transmit, to the device, an acknowledgement message or a negative acknowledgement message indicating whether the first key is valid based on receiving the connection request. In some cases, the authenticating allows the device to communicate with the application platform and subscribe to the service.

The software update component 415 may receive, by a field server, a notification that a software update is sent to a device, the field server for authenticating that software of the device is secure.

The flag manager 420 may set, by the field server, a flag that indicates an association between the device and the software update in a memory based on receiving the notification.

The key invalidity manager 425 may determine that the first key received from the device is invalid based on receiving the connection request. In some examples, the key invalidity manager 425 may identify a discrepancy between the certificate associated with the first key and a certificate associated with the device based on receiving the connection request. In some examples, the key invalidity manager 425 may compare the certificate associated with the first key to a certificate stored by the field server.

The key validity manager 430 may determine the first key as valid based on the flag indicating the association. In some examples, the key validity manager 430 may store the first key in a list in the memory based on determining the first key as valid based on the flag. In some cases, the certificate associated with the first key received from the device is based on a hash of the software of the device.

The request receiver 435 may receive, from the device, a connection request that includes a certificate associated with a first key for authenticating the device. In some examples, the request receiver 435 may process an additional connection request from the device based on determining the first key as valid.

The certificate component 440 may receive an updated certificate associated with the device after the software of the device is updated. In some examples, the certificate component 440 may update a certificate associated with the device stored by the field server based on receiving the updated certificate.

Figure 5:
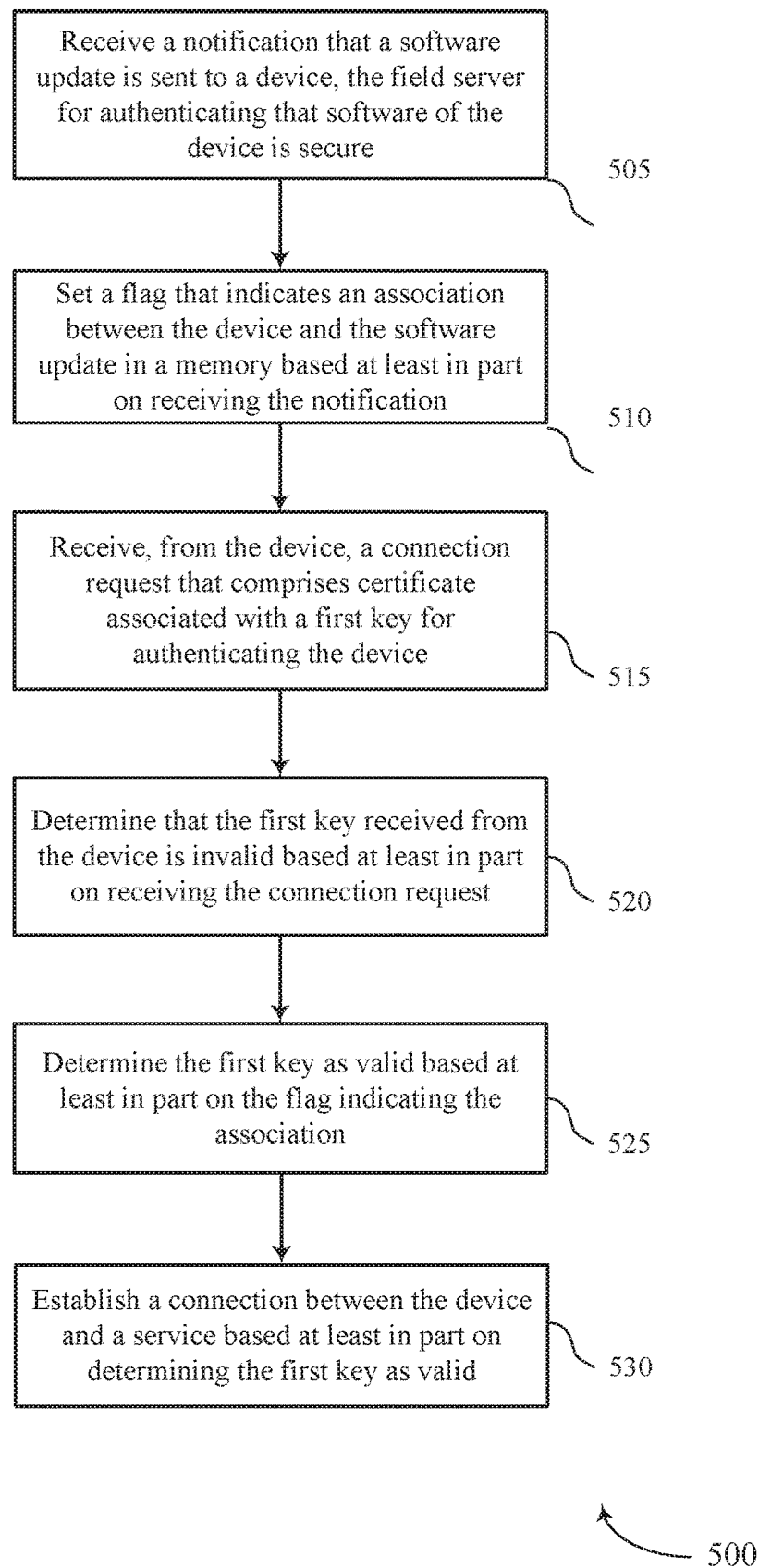
FIGS. 5 and 6 show flowcharts illustrating a method or methods that support authenticating a device using a remote host in accordance with examples as disclosed herein.

FIG. 5 shows a flowchart illustrating a method or methods 500 that supports authenticating a device using a remote host in accordance with examples as disclosed herein. The operations of method 500 may be implemented by a field server or its components as described herein. For example, the operations of method 500 may be performed by a field server as described with reference to FIG. 3. In some examples, a field server may execute a set of instructions to control the functional elements of the field server to perform the described functions. Additionally or alternatively, a field server may perform aspects of the described functions using special-purpose hardware.

At 505, the field server may receive a notification that a software update is sent to a device, the field server for authenticating that software of the device is secure. The operations of 505 may be performed according to the methods described herein. In some examples, aspects of the operations of 505 may be performed by a software update component as described with reference to FIG. 3.

At 510, the field server may set a flag that indicates an association between the device and the software update in a memory based on receiving the notification. The operations of 510 may be performed according to the methods described herein. In some examples, aspects of the operations of 510 may be performed by a flag manager as described with reference to FIG. 3.

At 515, the field server may receive, from the device, a connection request that includes a certificate associated with a first key for authenticating the device. The operations of 515 may be performed according to the methods described herein. In some examples, aspects of the operations of 515 may be performed by a request receiver as described with reference to FIG. 3.

At 520, the field server may determine that the first key received from the device is invalid based on receiving the connection request. The operations of 520 may be performed according to the methods described herein. In some examples, aspects of the operations of 520 may be performed by a key invalidity manager as described with reference to FIG. 3.

At 525, the field server may determine the first key as valid based on the flag indicating the association. The operations of 525 may be performed according to the methods described herein. In some examples, aspects of the operations of 525 may be performed by a key validity manager as described with reference to FIG. 3.

At 530, the field server may establish a connection between the device and a service based on determining the first key as valid. The operations of 530 may be performed according to the methods described herein. In some examples, aspects of the operations of 530 may be performed by a connection component as described with reference to FIG. 3.

In some examples, an apparatus as described herein may perform a method or methods, such as the method 500. The apparatus may include features, means, or instructions (e.g., a non-transitory computer-readable medium storing instructions executable by a processor) for receiving, by a field server, a notification that a softhare update is sent to a device, the field server for authenticating that software of the device is secure, setting, by the field server, a flag that indicates an association between the device and the software update in a memory based on receiving the notification, receiving, from the device, a connection request that includes a certificate associated with a first key for authenticating the device, determining that the first key received from the device is invalid based on receiving the connection request, determining the first key as valid based on the flag indicating the association, and establishing a connection between the device and a service based on determining the first key as valid.

Some examples of the method 500 and the apparatus described herein may further include operations, features, means, or instructions for storing the first key in a list in the memory based on determining the first key as valid based on the flag. Some examples of the method 500 and the apparatus described herein may further include operations, features, means, or instructions for receiving an updated certificate associated with the device after the software of the device may be updated, and updating a certificate associated with the device stored by the field server based on receiving the updated certificate.

Some examples of the method 500 and the apparatus described herein may further include operations, features, means, or instructions for processing an additional connection request from the device based on determining the first key as valid. Some examples of the method 500 and the apparatus described herein may further include operations, features, means, or instructions for identifying a discrepancy between the certificate associated with the first key and a certificate associated with the device based on receiving the connection request, and validating the connection request regardless of the discrepancy based on the flag, where determining the first key may be valid may be based on validating the connection request.

Some examples of the method 500 and the apparatus described herein may further include operations, features, means, or instructions for comparing the certificate associated with the first key to a certificate stored by the field server, and authenticating the device for access to an application platform based on comparing the certificate associated with the first key and the certificate.

Some examples of the method 500 and the apparatus described herein may further include operations, features, means, or instructions for validating a subscription to the service based on authenticating the device. In some examples of the method 500 and the apparatus described herein, the authenticating allows the device to communicate with the application platform and subscribe to the service.

In some examples of the method 500 and the apparatus described herein, the certificate associated with the first key received from the device may be based on a hash of the software of the device. Some examples of the method 500 and the apparatus described herein may further include operations, features, means, or instructions for transmitting, to the device, an acknowledgement message or a negative acknowledgement message indicating whether the first key may be valid based on receiving the connection request.

Figure 6:
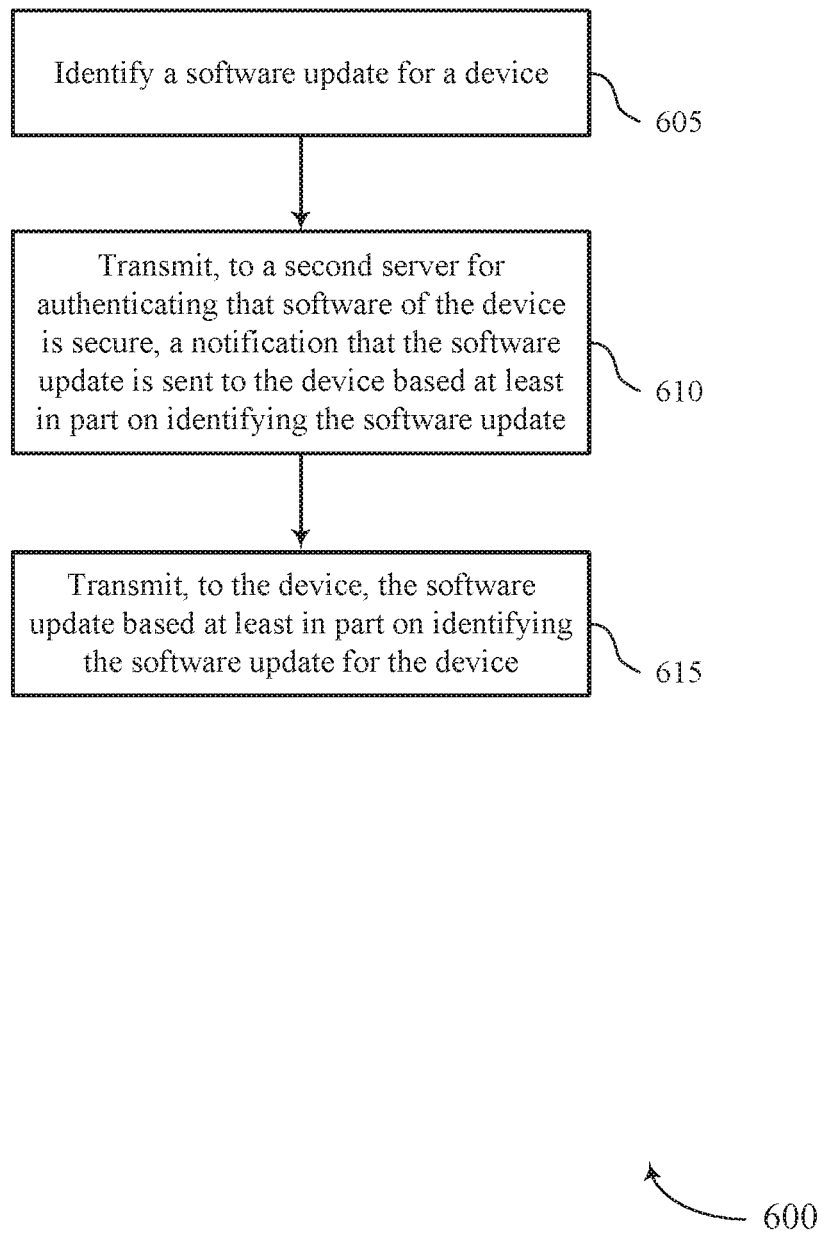

FIG. 6 shows a flowchart illustrating a method or methods 600 that supports authenticating a device using a remote host in accordance with examples as disclosed herein. The operations of method 600 may be implemented by a management server (which may be referred to as a first server) or its components as described herein. For example, the operations of method 600 may be performed by a management server as described with reference to FIG. 2-3. In some examples, a management server may execute a set of instructions to control the functional elements of the management server to perform the described functions. Additionally or alternatively, a management server may perform aspects of the described functions using special-purpose hardware.

At 605, the management server may identify a software update for a device. The operations of 605 may be performed according to the methods described herein. In some examples, aspects of the operations of 605 may be performed by a software update identifier as described with reference to FIG. 4.

At 610, the management server may transmit, to a second server for authenticating that software of the device is secure, a notification that the software update is sent to the device based on identifying the software update. The operations of 610 may be performed according to the methods described herein. In some examples, aspects of the operations of 610 may be performed by a notification transmitter as described with reference to FIG. 4.

At 615, the management server may transmit, to the device, the software update based on identifying the software update for the device. The operations of 615 may be performed according to the methods described herein. In some examples, aspects of the operations of 615 may be performed by a software update transmitter as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for identifying, by a first server, a software update for a device, transmitting, to a second server for authenticating that software of the device is secure, a notification that the software update is sent to the device based on identifying the software update, and transmitting, to the device, the software update based on identifying the software update for the device.

Some examples of the method 600 and the apparatus described herein may further include operations, features, means, or instructions for receiving, from the device, a completion message indicating that the device performed the software update, and transmitting an updated certificate associated with the device based on receiving the completion message. In some examples of the method 600 and the apparatus described herein, the notification may be for identifying that a certificate associated with a key received from the device may be altered based on the software update.

Some examples of the method 600 and the apparatus described herein may further include operations, features, means, or instructions for configuring a portion of the device to operate in an append write mode based on transmitting the software update. Some examples of the method 600 and the apparatus described herein may further include operations, features, means, or instructions for appending additional information to the software based on configuring the portion of the device to operate in the append write mode, preventing access to a version of the software available prior to the software update based at least in part on appending the additional information, and updating a key received from the device based on appending the additional information.

It should be noted that the methods described herein are possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that may, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration." and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM. ROM, electrically erasable programmable read-only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving, by a field server, a notification that a software update is sent to a device, the field server for authenticating that software of the device is secure;
setting, by the field server, a flag that indicates an association between the device and the software update in a memory based at least in part on receiving the notification;
receiving, from the device, a connection request that comprises a certificate associated with a first key for authenticating the device;
determining that the first key received from the device is invalid based at least in part on receiving the connection request;
determining the first key as valid based at least in part on the flag indicating the association; and
establishing a connection between the device and a service based at least in part on determining the first key as valid.

2. The method of claim 1, further comprising:
storing the first key in a list in the memory based at least in part on determining the first key as valid based at least in part on the flag.

3. The method of claim 2, further comprising:
receiving an updated certificate associated with the device after the software of the device is updated; and
updating a second certificate associated with the device stored by the field server based at least in part on receiving the updated certificate.

4. The method of claim 3, further comprising:
processing an additional connection request from the device based at least in part on determining the first key as valid.

5. The method of claim 1, further comprising:
identifying a discrepancy between the certificate associated with the first key and a second certificate associated with the device based at least in part on receiving the connection request; and
validating the connection request regardless of the discrepancy based at least in part on the flag, wherein determining the first key is valid is based at least in part on validating the connection request.

6. The method of claim 1, further comprising:
comparing the certificate associated with the first key to a second certificate stored by the field server; and
authenticating the device for access to an application platform based at least in part on comparing the certificate associated with the first key and the second certificate.

7. The method of claim 6, further comprising:
validating a subscription to the service based at least in part on authenticating the device.

8. The method of claim 6, wherein the authenticating allows the device to communicate with the application platform and subscribe to the service.

9. The method of claim 1, wherein the certificate associated with the first key received from the device is based at least in part on a hash of the software of the device.

10. The method of claim 1, further comprising:
transmitting, to the device, an acknowledgement message or a negative acknowledgement message indicating whether the first key is valid based at least in part on receiving the connection request.

11. A method, comprising:
identifying, by a first server, a software update for a device;
transmitting, to a second server for authenticating that software of the device is secure, a notification that the software update is sent to the device based at least in part on identifying the software update; and
transmitting, to the device, the software update based at least in part on identifying the software update for the device;
receiving, from the device, a completion message indicating that the device performed the software update; and
transmitting, from the first server to the second server, an updated certificate associated with the device based at least in part on receiving the completion message.

12. The method of claim 11, wherein the notification is for identifying that a certificate associated with a key received from the device is altered based at least in part on the software update.

13. The method of claim 11, further comprising:
configuring a portion of the device to operate in an append write mode based at least in part on transmitting the software update.

14. The method of claim 13, further comprising:
appending additional information to the software based at least in part on configuring the portion of the device to operate in the append write mode;
preventing access to a version of the software available prior to the software update based at least in part on appending the additional information; and
updating a key received from the device based at least in part on appending the additional information.

15. The method of claim 11, further comprising:
setting, by the second server, a flag that indicates an association between the device and the software update in a memory based at least in part on receiving the notification.

16. A system, comprising:
a first server device configured to;
identify a software update for a device;
transmit a notification that the software update is sent to the device based at least in part on identifying the software update; and
a second server device in electronic communication with the first server device and configured to;
receive the notification that the software update is sent to the device;
set a flag that indicates an association between the device and the software update in a memory based on least in part on receiving the notification;
receive a connection request that comprises a certificate associated with a first key for authenticating the device; and
accept the first key as valid based at least in part on the flag indicating the association.

17. The system of claim 16, further comprising:
the device in electronic communication with the first server device and the second server device, the device is configured to;
receive the software update; and
perform the software update based at least in part on receiving the software update.

18. The system of claim 17, wherein the device is further configured to:
hash software of the device; and
generate the first key based at least in part on the hash of the software and a device-specific secret.

19. The system of claim 17, wherein the device is further configured to:

determine the connection request that comprises the certificate associated with the first key for authenticating the device based at least in part on performing the software update.

20. The system of claim 16, wherein the second server device is further configured to:
identify that the first key received from the device is invalid based at least in part on receiving the connection request.

21. The system of claim 16, wherein the second server device is further configured to:
compare the certificate associated with the first key to a second certificate associated with the device; and
perform an authentication procedure for the device to access an application service based at least in part on comparing the certificate associated with the first key to the second certificate.

22. The system of claim 16, wherein the first server device is further configured to:
transmit an updated certificate associated with the device after the software update of the device is completed.

* * * * *